United States Patent
Kitahara et al.

(10) Patent No.: US 7,279,533 B2
(45) Date of Patent: Oct. 9, 2007

(54) POLAR-GROUP-CONTAINING CYCLIZED RUBBER AND PROCESS FOR PRODUCING SAME

(75) Inventors: Shizuo Kitahara, Tokyo (JP); Toshio Kase, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/542,911

(22) PCT Filed: Jan. 20, 2004

(86) PCT No.: PCT/JP2004/000406

§ 371 (c)(1),
(2), (4) Date: Jul. 21, 2005

(87) PCT Pub. No.: WO2004/065427

PCT Pub. Date: Aug. 5, 2004

(65) Prior Publication Data

US 2006/0063890 A1  Mar. 23, 2006

(30) Foreign Application Priority Data

Jan. 23, 2003 (JP) .............................. 2003-015394

(51) Int. Cl.
*C08F 8/48* (2006.01)
*C08F 36/04* (2006.01)

(52) U.S. Cl. ............... 525/333.1; 525/194; 525/331.9; 525/333.2; 525/342; 525/343; 525/374; 525/384; 525/385; 525/386

(58) Field of Classification Search ............. 525/331.9, 525/333.1, 333.2, 194, 342, 343, 374, 384, 525/385, 386
See application file for complete search history.

(56) References Cited

U.S. PATENT DOCUMENTS

| 3,853,815 A | * | 12/1974 | Lubowitz ..................... 528/109 |
| 4,678,841 A | * | 7/1987 | Yoshizawa et al. .......... 525/353 |
| 4,910,261 A | * | 3/1990 | Kaszas et al. ............... 525/314 |
| 5,498,657 A | * | 3/1996 | Sugiyama et al. .......... 524/463 |

FOREIGN PATENT DOCUMENTS

| GB | 1205230 A | 9/1970 |
| JP | 57-145103 A | 9/1982 |
| JP | 61-163904 A | 7/1986 |
| JP | 7-268031 A | 10/1995 |
| JP | 51-12827 | 1/1996 |
| JP | 9-110928 A | 4/1997 |

OTHER PUBLICATIONS

English Language translation of JP 57-145103; publication date: Sep. 8, 1982.*

* cited by examiner

*Primary Examiner*—Fred Teskin
(74) *Attorney, Agent, or Firm*—Birch, Stewart, Kolasch & Birch, LLP

(57) ABSTRACT

A main object of the invention is to provide a polar-group-containing cyclized rubber making it possible to improve remarkable the adhesiveness between paint and a molded product made of a nonpolar polymer such as polypropylene or polyethylene, and a process for producing the same. In order to attain the object, the invention provides a polar-group-containing cyclized rubber which has a polar group at a terminal of a polymer chain thereof, has a weight-average molecular weight of 1000 to 1,000,000, and is obtained by cyclizing a conjugated diene polymer having the polar group at a terminal of a polymer chain thereof.

19 Claims, No Drawings

POLAR-GROUP-CONTAINING CYCLIZED RUBBER AND PROCESS FOR PRODUCING SAME

TECHNICAL FIELD

The present invention relates to a polar-group-containing cyclized rubber and a process for producing the same, more specifically, a polar-group-containing cyclized rubber making it possible to improve remarkably the adhesiveness between paint and a molded product made of a nonpolar polymer such as polypropylene or polyethylene, and a process for producing the same.

BACKGROUND ART

In many cases, molded products made of a polyolefin such as polyethylene or polypropylene are used in the state that the surface is painted with a paint in order to improve the beautification property, endurance and other properties. However, polyolefin is low in polarity and is poor in adhesiveness to the paint, so as to result in a problem that the painted film is easily peeled.

It is well known that a paint comprising a cyclized product of a conjugated diene polymer such as polyisoprene adheres well to polyolefin (Japanese Patent Application Laid-Open (JP-A) No. 51-12827). In order to improve the adhesiveness further, the use of a modified conjugated diene polymer cyclized product is suggested, which is obtained by adding maleic anhydride to a conjugated diene polymer having a low molecular weight and containing 70% or more of cis-1,4 bonds, then conducting cyclization-reaction (JP-A No. 57-145103).

Although the use of a conjugated diene polymer cyclized product as described above makes it possible to yield a paint whose adhesiveness to a polyolefin molded product is somewhat good, the degree of the improvement is insufficient.

DISCLOSURE OF THE INVENTION

An object of the present invention is to provide a polar-group-containing cyclized rubber making it possible to improve remarkably the adhesiveness between paint and a molded product made of a nonpolar polymer such as polypropylene or polyethylene, and a process for producing the same.

The present inventors have repeated eager researches in order to solve the above-mentioned problems so as to find out that the above-mentioned object can be attained by incorporating a cyclized rubber having a weight-average molecular weight in a specific range and obtained by cyclizing a conjugated diene polymer having, at a terminal of a polymer chain thereof, a polar group into raw polypropylene or by using the cyclized rubber as a bonding component of a primer for polypropylene molded product. The present invention has been made based on this finding.

Thus, according to the present invention, the following invention aspects 1 to 20 are provided:

1. A polar-group-containing cyclized rubber having a polar group at a terminal of a polymer chain thereof and having a weight-average molecular weight of 1,000 to 1,000,000.
2. The polar-group-containing cyclized rubber wherein the ratio of the weight-average molecular weight (Mw) to the number-average molecular weight (Mn) thereof (Mw/Mn) is 4 or less.
3. The polar-group-containing cyclized rubber wherein a cyclization ratio is 10% or more.
4. The polar-group-containing cyclized rubber wherein a glass transition temperature is from −50 to 200° C.
5. The polar-group-containing cyclized rubber wherein a gel amount is 10% or less by weight.
6. The polar-group-containing cyclized rubber wherein the polar group is at least one group selected from the group consisting of carboxyl, hydroxyl, amino, thiol, ester, cyano and silyl groups.
7. The polar-group-containing cyclized rubber wherein the polar group is carboxyl or hydroxyl group.
8. A process for producing a polar-group-containing cyclized rubber comprising: the steps of:
   using an organic active metal catalyst to polymerize a conjugated diene monomer, or a conjugated diene monomer and a monomer copolymerizable with the conjugated diene monomer to produce an active conjugated diene polymer having an active metal at a terminal of a polymer chain thereof;
   causing a polar-group-containing compound to react with the active conjugated diene polymer to produce a polar-group-containing conjugated diene polymer having, at a terminal of a polymer chain thereof, a polar group originating from the polar group in the polar-group-containing compound; and
   using a cyclizing catalyst to cyclize the polar-group-containing conjugated diene polymer to produce the polar-group-containing cyclized rubber.
9. The process for producing a polar-group-containing cyclized rubber wherein the conjugated diene monomer is isoprene.
10. The process for producing a polar-group-containing cyclized rubber wherein the polar-group-containing compound is an epoxy compound or carbon dioxide.
11. A process for producing a polar-group-containing cyclized rubber, comprising: the steps of:
    using a polar-group-containing organic active metal catalyst to polymerize a conjugated diene monomer, or a conjugated diene monomer and a monomer copolymerizable with the conjugated diene monomer to produce a polar-group-containing conjugated diene polymer having a polar group at a polymerization initiation terminal thereof; and
    using a cyclizing catalyst to cyclize the polar-group-containing conjugated diene polymer to produce the polar-group-containing cyclized rubber.
12. The process for producing a polar-group-containing cyclized rubber wherein the polar-group-containing organic active metal catalyst is an organic alkali metal amide compound.
13. The process for producing a polar-group-containing cyclized rubber wherein the conjugated diene monomer is isoprene.
14. A modifier for polymer-molding material which comprises, as an effective component, the polar-group-containing cyclized rubber.
15. A polymer composition, wherein the modifier for polymer-molding material is incorporated into a polymer-molding material.
16. The polymer composition wherein the incorporated amount of the modifier for polymer-molding material is from 0.1 to 50 parts by weight for 100 parts by weight of the polymer in the polymer-molding material.
17. The polymer composition wherein the polymer in the polymer-molding material is a hydrocarbon thermoplastic resin.
18. A coating agent which comprises the polar-group-containing cyclized rubber.

19. The coating agent which is for hydrocarbon thermoplastic resin.
20. The coating agent which is a primer.

According to the present invention, provided is a polar-group-containing cyclized rubber having a polar group at a terminal of a polymer chain thereof and having a weight-average molecular weight of 1,000 to 1,000,000. By incorporating this cyclized rubber into raw polypropylene or using the cyclized rubber as a bonding component of a primer for polypropylene molded product, the adhesiveness between a nonpolar polypropylene molded product and paint is remarkably improved.

BEST MODES FOR CARRYING OUT THE INVENTION (Polar-Group-Containing Cyclized Rubber)

The polar-group-containing cyclized rubber of the present invention has a polar group at a terminal of a polymer chain thereof and has a weight-average molecular weight of 1,000 to 1,000,000.

The polar group may be any group that has any atom other than carbon and hydrogen atoms, and examples thereof include carboxyl, hydroxyl, amino, thiol, ester, cyano and silyl groups. Of these, carboxyl, hydroxyl and amino groups are preferred, carboxyl and hydroxyl groups are more preferred, and a carboxyl group is in particular preferred.

The polar-group-containing cyclized rubber essentially has a polar group at the position of at least one terminal of a polymer chain thereof, and may have polar groups at two or more terminals thereof.

The weight-average molecular weight of the polar-group-containing cyclized rubber is from 1,000 to 1,000,000, preferably from 10,000 to 500,000, more preferably from 30,000 to 300,000. If the weight-average molecular weight is low, the adhesiveness to paint is poor. Conversely, if the weight-average molecular weight is high, it is difficult to handle the polar-group-containing cyclized rubber when the rubber is produced or used.

The ratio of the weight-average molecular weight (Mw) of the polar-group-containing cyclized rubber to the number-average molecular weight (Mn) thereof (Mw/Mn) is not particularly limited, and is usually 4 or less, preferably 3 or less, more preferably 2 or less.

The cyclization ratio of the polar-group-containing cyclized rubber is not particularly limited, and is usually 10% or more, preferably from 40 to 95%, more preferably from 60 to 90%, in particular preferably from 70 to 85%. If the cyclization ratio is too low, the adhesiveness to paint is poor. Conversely, if the cyclization ratio is high, the polar-group-containing cyclized rubber having a high cyclization ratio is not easily produced and further gelatinization advances so that the preparation of a solution thereof may become difficult.

The cyclization ratio is the following value: at each of times before and after cyclization reaction of a conjugated diene polymer used as a raw material, the peak area of protons originating from the double bonds therein is measured by $^1$H-NMR analysis; the percentage of the double bonds remaining in the cyclized product after the cyclization reaction is obtained by regarding the area before the cyclization reaction as 100; and a value (%) represented by the calculation equation=(100−the percentage of the double bonds remaining in the cyclized product) is calculated.

The glass transition temperature of the polar-group-containing cyclized rubber is not particularly limited, can be appropriately selected in accordance with the use purpose thereof, and is usually from −50 to 200° C., preferably from 0 to 100° C., more preferably from 20 to 90° C., in particular preferably from 30 to 70° C.

The cyclization degree (n) of the cyclized rubber, that is, the linking of the rings is usually in the range of 1 to 3. The gel amount in the polar-group-containing cyclized rubber is usually 10% or less by weight, preferably 5% or less by weight. It is particularly preferred that the cyclized rubber is a cyclized rubber which does not substantially have any gel. If the gel amount is large, a problem may be caused in the step of coating in a solution state.

(Process for Producing the Polar-Group-Containing Cyclized Rubber)

The polar-group-containing cyclized rubber of the present invention can be produced by the following two kinds of processes.

(1) First Producing Process

The first producing process of the polar-group-containing cyclized rubber comprises: the step (1-1) of using an organic active metal catalyst to polymerize a conjugated diene monomer, or a conjugated diene monomer and a monomer copolymerizable with the conjugated diene monomer to produce an active conjugated diene polymer having an active metal at a terminal of a polymer chain thereof;

the step (1-2) of causing a polar-group-containing compound to react with the active conjugated diene polymer to produce a polar-group-containing conjugated diene polymer having, at a terminal of a polymer chain thereof, a polar group originating from the polar group in the polar-group-containing compound; and the step (1-3) of using a cyclizing catalyst to cyclize the polar-group-containing conjugated diene polymer to produce the polar-group-containing cyclized rubber.

In the step (1-1), an organic active metal catalyst is used to polymerize a conjugated diene monomer, or a conjugated diene monomer and a monomer copolymerizable with the conjugated diene monomer to produce an active conjugated diene polymer having an active metal at a terminal of a polymer chain thereof.

Examples of the conjugated diene monomer include 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, and 3-butyl-1,3-octadiene. Of these, 1,3-butadiene and isoprene can be preferably used, and isoprene can be more preferably used. These monomers may be used alone or in combination of two or more thereof.

The used amount of the conjugated diene monomer is not particularly limited, and is appropriately selected to set the content of units of the conjugated diene monomer in the active conjugated diene polymer usually to 40% or more by mole, preferably to 60% or more by mole, more preferably to 80% or more by mole. If this content is small, the cyclization ratio is not easily raised so that expected property-improving effects tend not to be easily obtained.

Examples of the monomer copolymerizable with the conjugated diene monomer include aromatic vinyl monomers such as styrene, α-methylstyrene, p-isopropylstyrene, p-phenylstyrene, p-methoxystyrene, p-methoxymethylstyrene, p-tert-butoxystyrene, chloromethylstyrene, 2-fluorostyrene, 3-fluorostyrene, pentafluorostyrene, vinyltoluene, vinylnaphthalene, and vinylanthracene; and olefin monomers such as ethylene, propylene, and isobutylene. Of these, aromatic vinyl monomers can be preferably used, and styrene and α-methylstyrene can be more preferably used.

The organic active metal catalyst is not limited to any especial kind if the catalyst makes it possible to living-polymerize the above-mentioned monomer(s). Specific examples thereof include organic alkali metal compounds, and organic alkaline earth metal compounds. Of these, organic alkali metal compounds are preferably used.

Examples of the organic alkali metal compounds include organic monolithium compounds such as n-butyllithium, sec-butyllithium, t-butyllithium, hexyllithium, phenyllithium, and stylbenelithium; organic polyvalent lithium compounds such as dilithiomethane, 1,4-dilithiobutane, 1,4-dilithio-2-ethylcyclohexane, and 1,3,5-trilithiobenzene; and sodium naphthalene and potassium naphthalene. Of these, organic lithium compounds can be preferably used, and organic monolithium compounds can be more preferably used.

Examples of the organic alkaline earth metal compounds include compounds having a metal such as barium, strontium or calcium, disclosed in JP-A Nos. 51-115590, 52-9090, 52-17591, 52-30543, 52-48910, 52-98077, 56-112916 and 57-100146. Specific examples thereof include n-butylmagnesium bromide, n-hexylmagnesium bromide, ethoxycalcium, t-butoxystrontium, ethoxybarium, isopropoxybarium, ethylmercaptobarium, t-butoxybarium, phenoxybarium, and ethylbarium.

The organic active metal catalysts may be used alone or in combination of two or more thereof. The used amount thereof is appropriately selected in accordance with the kind of the catalyst(s) or a required weight-average molecular weight of the polymer to be generated, and is usually from 0.01 to 100 mmol, preferably from 0.05 to 20 mmol, more preferably from 0.1 to 10 mmol for 100 g of the monomer(s).

Polymerization by use of the above-mentioned catalyst(s) is usually conducted in a polymerization solvent. The polymerization solvent is not limited to any especial kind if the solvent does not inhibit the polymerization.

Examples of the polymerization solvent include aliphatic saturated hydrocarbons such as n-butane, n-pentane, isopentane, n-hexane, n-heptane, and iso-octane; alicyclic saturated hydrocarbons such as cyclopentane, cyclohexane, and methylcyclopentane; and aromatic hydrocarbons such as benzene and toluene. Of these, n-hexane, cyclohexane, toluene and so on are preferred. If necessary, an unsaturated hydrocarbon having a very low polymerability, such as 1-butene, cis-2-butene or 2-hexene, may be used together. These polymerization solvents may be used alone or in combination of two or more thereof.

The used amount of the polymerization solvent is not particularly limited, and is an amount such that the concentration of the monomer(s) used in the polymerization will be usually from 1 to 50% by weight, preferably from 10 to 40% by weight.

At the time of the polymerization reaction, a polar compound may be used in order to adjust the bonding structure of units of the conjugated diene monomer. The polar compound is not limited to any especial kind if the compound is used in ordinary anionic polymerization using an organic active metal catalyst.

Examples of the polar compound include ether compounds such as dibutyl ether, ethylene glycol dibutyl ether, and tetrahydrofuran; tertiary amines such as tetramethylethylenendiamine, trimethylamine, triethylamine, pyridine, and quinuclidine; alkali metal alkoxides such as potassium-t-amyloxide, and potassium-t-butyloxide; and phosphine derivatives such as triphenylphosphine. Of these, tertiary amines and ether compounds can be preferably used, tertiary amines can be more preferably used, and tetramethylethyl-enediamine can be in particular preferably used. These polar compounds may be used alone or in combination of two or more.

In the case of using the polar compound(s), the used amount thereof is usually 200 mol or less, preferably from 0.1 to 100 mol, more preferably from 0.5 to 50 mol, in particular preferably from 0.8 to 20 mol per mole of the organic active metal catalyst.

The polymerization reaction is usually conducted in a batch polymerization manner, a continuous polymerization manner or some other manner at a temperature ranging from −78 to 150° C.

The polymerization time is not particularly limited, and the polymerization reaction is preferably conducted until the monomer(s) used in the polymerization react(s) substantially quantitatively.

In a manner as described above, an active conjugated diene polymer having an active metal at a terminal of a polymer chain thereof is produced.

In the step (1-2), a polar-group-containing compound is caused to react with the active conjugated diene polymer to produce a polar-group-containing conjugated diene polymer having, at a terminal of a polymer chain thereof, a polar group originating from the polar group in the polar-group-containing compound.

The polar-group-containing compound is not limited to any especial kind if the compound can react with the active conjugated diene polymer to introduce, into a terminal of a polymer chain thereof, a polar group originating from the polar group in the compound.

A preferred example of the polar-group-containing compound is a compound containing, in the molecule thereof, at least one polar group selected from the group consisting of >C=O, >C=S, amino, aziridine, and epoxy groups.

Specific examples of the polar-group-containing compound include N-substituted cyclic amides such as N-methyl-β-propiolactam, N-phenyl-β-propiolactam, N-methyl-2-pyrrolidone, N-vinyl-2-pyrrolidone, N-phenyl-2-pyrrolidone, N-t-butyl-2-pyrrolidone, N-methyl-5-methyl-2-pyrrolidone, N-methyl-2-piperidone, N-vinyl-2-piperidone, N-phenyl-2-piperidone, N-methyl-ε-caprolactam, N-phenyl-ε-caprolactam, N-methyl-ε-caprolactam, N-phenyl-ε-caprolactam, N-methyl-ω-laurylolactam, and N-vinyl-ω-laurylolactam; N-substituted cyclic urea compounds such as 1,3-dimethylethylene urea, 1,3-divinylethylene urea, 1,3-diethyl-2-imidazolidinone, and 1-methyl-3-ethyl-2-imidazolidinone; N-substituted aminoketones such as 4-N,N-dimethylaminoacetopnenone, 4-N,N-diethylaminoacetophenone, 1,3-bis(diphenylamino)-2-propanone, 1,7-bis(methylethylamino)-4-heptanone, 4-N,N-dimethylaminobenzophenone, 4-N,N-di-t-butylaminobenzophenone, 4-N,N-diphenylaminobenzophenone, 4,4'-bis(dimethylamino)benzophenone, 4,4'-bis(diethylamino)benzophenone, and 4,4'-bis(diphenylamino)benzophenone; N-substituted aminoaldehydes such as 4-N,N-dimethylaminobenzaldehyde, 4-N,N-diphenylaminobenzaldehyde, and 4-N,N-divinylaminobenzaldehyde; isocyanates such as phenylisocyanate, 2,4-tolylene diisocyanate, 2,6-tolylene diisocyanate, diphenylmethane diisocyanate, naphthalene diisocyanate, and aromatic polyisocyanates of dimers and trimers thereof;

carbodiimides such as dimethylcarbodiimide, diethylcarbodiimide, dipropylcarbodiimide, dibutylcarbodiimide, dihexylcarbodiimide, dicyclohexylcarbodiimide, dibenzylcarbodiimide, diphenylcarbodiimide, methylpropylcarbodiimide, butylcyclohexylcarbodiimide, ethylbenzylcarbodiimide, propylphenylcarbodiimide, and phenylbenzylcarbodiimide; N-unsubstituted aziridine compounds such as ethyleneimine and propyleneimide;

epoxy compounds such as ethylene oxide, propylene oxide, 1,2-epoxybutane, 1,2-epoxy-iso-butane, 2,3-epoxybutane, 1,2-epoxyhexane, 1,2-epoxyoctane, 1,2-epoxydecane, 1,2-epoxytetradecane, 1,2-epoxyhexadecane, 1,2-epoxyoctadecane, 1,2-epoxyeicosane, 1,2-epoxy-2-pentylpropane, 3,4-epoxy-1-butene, 1,2-epoxy-5-hexene, 1,2-epoxy-9-decene, 1,2-epoxycyclopentane, 1,2-epoxycyclohexane, 1,2-epoxycyclododecane, 1,2-epoxyethylbenzene, 1,2-epoxy-1-methoxy-2-methylpropane, glycidyl methyl ether, glycidyl ethyl ether, glycidyl isopropyl ether, glycidyl allyl ether, glycidyl phenyl ether, glycidyl butyl ether, 2-(3,4-epoxycyclohexyl) ethyltrimethoxysilane, and 3-glycidyloxypropyltrimethoxysilane; and carbon dioxide. Of these, epoxy compounds and carbon dioxide can be preferably used, ethylene oxide, propylene oxide and carbon dioxide can be more preferably used, and carbon dioxide can be in particular preferably used.

The polar-group-containing compounds may be used alone or in combination of two or more. The used amount thereof may be appropriately selected in accordance with the kind of the polar-group-containing compound(s) and required properties, and is usually from 0.1 to 50 equivalents, preferably from 0.1 to 20 equivalents, more preferably from 0.1 to 10 equivalents of the metal in the organic active catalyst used in the polymerization.

The reaction between the active conjugated diene polymer and the polar-group-containing compound advances substantially quantitatively when the active conjugated diene polymer and the polar-group-containing compound are brought into contact with each other.

In this reaction, the reaction temperature and the reaction time can be selected into wide ranges. Usually, the reaction temperature is from room temperature to 120° C., and the reaction time is from several seconds to several hours.

After the polar-group-containing compound is caused to react with the active conjugated diene polymer, a polymerization terminator is added so as to terminate the polymerization reaction.

Examples of the polymerization terminator include alcohols such as methanol, ethanol, isopropanol, n-butanol, and t-butanol; phenols such as phenol, methylphenol, and 2,6-tert-butyl-hydroxytoluene; and water. Of these, methanol, t-butanol, and 2,6-tert-butyl-hydroxytoluene can be preferably used.

The used amount of the polymerization terminator is usually from 0.1 to 100 equivalents, preferably from 0.5 to 50 equivalents, more preferably from 1 to 10 equivalents of the metal in the organic active metal catalyst used in the polymerization.

As described above, a polar-group-containing conjugated diene polymer is produced which has, at a terminal of a polymer chain thereof, a polar group originating from the polar group in the polar-group-containing compound.

In the case of using, for example, carbon dioxide as the polar-group-containing compound, a polar-group-containing conjugated diene polymer is produced which has, at a terminal of a polymer chain thereof, a carboxyl group.

In the case of using an epoxy compound as the polar-group-containing compound, a polar-group-containing conjugated diene polymer is produced which has, at a terminal of a polymer chain thereof, a hydroxyl group.

Usually, the introduction ratio of the polar group into the polar-group-containing conjugated diene polymer is appropriately selected from the range of 10 to 100%. A conjugated diene polymer which contains no polar group may be contained in the whole of the resultant polymer.

The polar-group-introduction ratio can be decided by measuring the absorption intensities with a differential refractometer (RI) of GPC and an ultraviolet spectrophotometer (UV), obtaining the ratio therebetween (UV/RI), and then using a calibration curve prepared in advance, or measuring the acid value or hydroxyl value.

The resultant polar-group-containing conjugated diene polymer may be obtained as a solid material by removing the polymerization solvent in a usual way, or may be shifted to a subsequent step without changing the state of the solution of the polymer.

In the step (1-3), a cyclizing catalyst is used to cyclize the polar-group-containing conjugated diene polymer to produce a polar-group-containing cyclized rubber.

As the cyclizing catalyst, a material which is generally known as a cyclizing catalyst for conjugated diene polymer can be used.

Examples of the cyclizing catalyst include sulfuric acid; organic sulfonic acids such as monofluoromethanesulfonic acid, difluoromethanesulfonic acid, p-toluenesulfonic acid, xylenesulfonic acid, alkylbenzenesulfonic acids having an alkyl group having 2 to 16 carbon atoms, anhydrides thereof, and alkyl esters thereof; and metal halides such as boron trifluoride, boron trichloride, tin tetrachloride, titanium tetrachloride, aluminum chloride, diethylaluminum monochloride, aluminum bromide, antimony pentachloride, tungsten hexachloride, andiron chloride. These cyclizing catalysts may be used alone or in combination of two or more thereof.

Of these catalysts, organic sulfonic acid compounds can be preferably used, and p-toluenesulfonic acid can be more preferably used.

The used amount of the cyclizing catalyst(s) is appropriately selected in accordance with the kind of the cyclizing catalyst(s) and a required cyclization ratio, and is usually from 0.05 to 10 parts by weight, preferably from 0.1 to 5 parts by weight, more preferably from 0.3 to 2 parts by weight for 100 parts by weight of the polar-group-containing conjugated diene polymer.

The cyclization reaction advances when the polar-group-containing conjugated diene polymer and the cyclizing catalyst are brought into contact with each other, and the reaction is usually conducted in an inert solvent. The inert solvent is not limited to any especial kind if the solvent does not hinder the cyclization reaction.

As the inert solvent, the solvents described above as the polymerization solvent can be used. Of these, a solvent having a boiling point of 70° C. or higher can be preferably used.

The used amount of the inert solvent is not particularly limited, and is an amount such that the concentration of the polar-group-containing conjugated diene polymer will be preferably from 5 to 60% by weight, more preferably from 20 to 40% by weight.

The reaction temperature in the cyclization reaction is usually from 50 to 150° C., preferably from 80 to 110° C., and the reaction time is usually from 0.5 to 10 hours, preferably from 2 to 5 hours.

As described above, a polar-group-containing cyclized rubber is yielded which has, at a terminal of a polymer chain thereof, a polar group originating from the polar group in the polar-group-containing compound.

Usually, the resultant polar-group-containing cyclized rubber is obtained as a solid matter by inactivating the cyclizing catalyst in a usual way and subsequently performing the removal of the residue of the cyclization catalyst and the removal of the inert solvent.

(2) Second Producing Process

The second producing process of a polar-group-containing cyclized rubber comprises: the step (2-1) of using a polar-group-containing organic active metal catalyst to polymerize a conjugated diene monomer, or a conjugated diene monomer and a monomer copolymerizable with the conjugated diene monomer to produce a polar-group-containing conjugated diene polymer having a polar group at a polymerization initiation terminal thereof; and the step (2-2) of using a cyclizing catalyst to cyclize the polar-group-containing conjugated diene polymer to produce a polar-group-containing cyclized rubber.

In the step (2-1), a polar-group-containing organic active metal catalyst is used to polymerize a conjugated diene monomer, or a conjugated diene monomer and a monomer copolymerizable with the conjugated diene monomer to produce a polar-group-containing conjugated diene polymer having a polar group at a polymerization initiation terminal thereof.

The polar-group-containing organic active metal catalyst is not limited to any especial kind if the catalyst makes it possible that at the time of polymerizing the above-mentioned monomer(s) the polar group is introduced into an initiation terminal of the polymerization. An example of such a catalyst is an organic alkali metal amide compound. The organic alkali metal amide compound is a compound obtained by causing a secondary amine to react with the above-mentioned organic alkali metal compound.

Examples of the secondary amine include aliphatic secondary amines such as dimethylamine, methylethylamine, methylpropylamine, methylbutylamine, methylamylamine, amylhexylamine, diethylamine, ethylpropylamine, ethylbutylamine, ethylhexylamine, dipropylamine, diisopropylamine, propylbutylamine, dibutylamine, diamylamine, dihexylamine, diheptylamine, dioctylamine, methylcyclopentylamine, ethylcyclopentylamine, methylcyclohexylamine, dicyclopentylamine, and dicyclohexylamine; aromatic secondary amines such as diphenylamine, N-methylaniline, N-ethylaniline, dibenzylamine, N-methylbenzylamine, and N-ethylphenethylamine; and cyclic imines such as aziridine, acetidin, pyrrolidine, piperidine, 2-methylpiperidine, 3-methylpiperidine, 4-methylpiperidine, 3,5-dimethylpiperidine, 2-ethylpiperidine, hexamethyleneimine, heptamethyleneimine, dodecamethyleneimine, coniine, morpholine, oxazine, pyrroline, pyrrole, and azepine. These secondary amines are used alone or in combination of two or more thereof.

The used amount of the secondary amine(s) is usually from 0.5 to 2 equivalents, preferably from 0.8 to 1.5 equivalents, more preferably from 1 to 1.2 equivalents of the metal in the organic alkali metal compound.

The used amount of the polar-group-containing organic active metal catalyst is usually from 0.1 to 30 mmol, preferably from 0.2 to 15 mmol, more preferably from 0.3 to 10 mmol for 100 g of the monomer(s).

The method and conditions for the polymerization are the same as described about the step (1-1).

As described above, a polar-group-containing conjugated diene polymer having a polar group at a polymerization initiation terminal thereof is produced.

When the polymerization is performed using, for example, a catalyst obtained by reaction between dibutylamine and n-buytllithium, a polar-group-containing conjugated diene polymer having a dibutylamino group at a polymerization initiation terminal thereof is produced.

Usually, the resultant polar-group-containing diene polymer is obtained as a solid matter by terminating the polymerization reaction by the addition of a polymerization terminator and then removing the polymerization solvent in a usual way, or may be shifted to a subsequent step without changing the state of the solution of the polymer.

Before the polymerization terminator is added to terminate the polymerization reaction, a polar-group-containing compound is caused to react with the conjugated diene polymer having the active metal in the same manner as in the step (1-2), thereby making it possible to produce a polar-group-containing conjugated diene polymer also having, at a polymerization termination terminal thereof, a polar group originating from the polar group in the polar-group-containing compound.

The introduction ratio of the polar group into the polar-group-containing conjugated diene polymer can be measured in the same manner as in the step (1-2).

In the step (2-2), a cyclizing catalyst is used to cyclize the polar-group-containing conjugated diene polymer obtained in the step (2-1), thereby producing a polar-group-containing cyclized rubber.

This step can be conducted in the same way as in the step (1-3).

As described above, a polar-group-containing cyclized rubber is obtained which has, at a polymerization initiation terminal thereof, a polar group in the polar-group-containing organic active metal catalyst.

Usually, the resultant polar-group-containing cyclized rubber is obtained as a solid matter by inactivating the cyclizing catalyst in a usual way and subsequently performing the removal of the residue of the cyclizing catalyst and the removal of the inert solvent.

The polar-group-containing cyclized rubber of the present invention is used in the state that thereto are added compounding agents, such as colorants such as pigment and dye, an age resistor, a filler, a softener, and a wax. The compounding agents may be ones that are ordinarily used.

Examples of the age resistor include phenol-based age resistors such as 2,6-di-t-butylphenol, 2,2'-methylenebis(4-methyl-t-butylphenol), and tetrakis [methylene-3-(3',5'-di-t-buytl-4'-hydroxyphenyl) propionate] methane; amine-based age resistors such as phenyl-α-naphthylamine, diphenyl-p-phenylenediamine, and N-1,3-dimethylbutyl-N'-phenyl-p-phenylenediamine; and phosphorus-based age resistors such as tris(nonylphenyl) phosphate.

Examples of the filler include calcium carbonate, calcium oxide, magnesium oxide, calcium hydroxide, magnesium hydroxide, aluminum hydroxide, magnesium carbonate, calcium silicate, barium sulfate, mica, silica, carbon black, talc, clay, titanium dioxide, zinc oxide, glass fiber, and carbon fiber.

The used amount of the compounding agents can be appropriately selected in accordance with the purpose of the compounding and the kind of the compounding agents.

The shape of the polar-group-containing cyclized rubber can be appropriately selected in accordance with the use purpose thereof, and is usually in a pellet or powdery form. In order to make the rubber into a powdery form, it is advisable to pulverize the polar-group-containing cyclized rubber in a solid form, together with the above-mentioned compounding agents that are optionally added, by use of a pulverizer such as a Bantum mill, a jet mill, a disk mill, a ball mill or a colloid mill, under cooling.

The average particle size of the thus-obtained powdery particles is usually from 1 µm to 200 µm, preferably from 3 µm to 100 µm, more preferably from 5 µm to 50 µm. This average particle size is a particle size that corresponds to a 50% number-based integrated value in the number-based integral curve relative to the particle size, and that is measured by a laser diffraction scattering method.

The content of the cyclized rubber in the powdery particles is usually 5% or more by weight, preferably 10% by weight, more preferably 20% or more by weight, in particular preferably 30% or more by weight.

The shape of the powdery particles is not particularly limited, and may be, for example, a spherical form or an indeterminate form.

The powdery particles made of the polar-group-containing cyclized rubber of the present invention can be used as, for example, a powdery paint by making good use of a good adhesiveness to resin or metal. In the case of rendering the particles a powdery paint, a colorant is incorporated thereinto and further an age resistor, a filler, a softener, a wax and so on are appropriately incorporated thereinto in a usual way if necessary.

In the case of using pigment as the colorant, a benzidine type, azo type, or isoindoline type pigment is preferably used for yellow coloration, an azo lake type, rhodamine lake type, quinacridone type, naphthol type or diketopyrrolopyrrole type pigment is preferably used for magenta coloration, and a phthalocyanine type or indanthrene type pigment is preferably used for cyan coloration. For black coloration, carbon black is usually used. Examples of the carbon black include thermal black, acetylene black, channel black, furnace black, and lamp black.

In the case of using dye as the colorant, an azo type, nitro type, quinoline type, quinophthalone type, or methine type dye is preferably used for yellow coloration, an anthraquinone type, azo type or xanthene type dye is preferably used for magenta coloration, and an anthraquinone type, phthalocyanine type, or indoaniline type dye is preferably used for cyan coloration.

The used amount of the colorant should be appropriately in accordance with the hue and density to be obtained, and others, and is preferably from 0.1 to 50 parts by weight, more preferably from 1 to 20 parts by weight for 100 parts by weight of the cyclized rubber.

The powdery paint can be usually obtained by mixing the cyclized rubber, the colorant, and additives contained if necessary, pulverizing the mixture and then classifying the pulverized mixture.

The method for the mixing is not particularly limited, and may be, for example, a method of melting and mixing the above-mentioned components by use of a kneading machine such as a Banbury mixer, a kneader, a mixing roll, or a monoaxial or biaxial extruder.

It is advisable to perform the method for the pulverization in accordance with the above-mentioned method.

Examples of the method for the classification include wind force classification, centrifugal classification, and sieve classification.

By incorporating the polar-group-containing cyclized rubber of the present invention into various polymer-molding materials made of thermoplastic resin, thermosetting resin, elastomer or the like as a modifier for polymer-molding material, the adhesiveness between polymer-molding materials and paint can be improved. The cyclized rubber is also useful as a modifier for polymer-molding material to improve the dispersibility of different polymers constituting a polymer-molding material or the dispersibility of a compounding agent such as a filler or a pigment in a polymer-molding material to the polymer.

Examples of the polymer used in the polymer-molding material which is a target of the modification include:
1. Thermoplastic resins, such as hydrocarbon resin, polyester resin, polyamide resin, polyimide resin, polyurethane resin, polyetherimide resin, polysulfone resin, polyethersulfone resin, polyetheretherketone resin, polycarbonate resin, polyvinyl butyrate resin, polyarylate resin, and fluorine-contained resin.
2. Thermosetting resins, such as phenol resin, cresol resin, urea resin, melamine resin, alkyd resin, furan resin, unsaturated polyester resin, epoxy resin, and urethane resin.
3. Vulcanized rubbers of natural rubber, polybutadiene rubber, and styrene-butadiene rubber or the like; and elastomers such as olefin-based thermoplastic elastomers, styrene-based thermoplastic elastomers, polyester-based thermoplastic elastomers, and polyamide-based thermoplastic elastomers.

The incorporation thereof into the following resins, out of these, produces a large modifying effect based on the polar-group-containing cyclized rubber: hydrocarbon thermoplastic resins, such as: linear olefin-based resins such as polyethylene, polypropylene, and polypentene-1; addition copolymers made from ethylene and a norbornene compound; and cyclic olefin-based resins such as a hydrogenated ring-opened polymer made from a norbornene compound.

The above-mentioned polymers may be used alone or in combination of two or more thereof. If necessary, compounding agents may be appropriately incorporated thereinto, examples of the agents including: colorants such as a pigment and a dye; and an age resistor, a filler, a softener, a wax, an antistatic agent, a stabilizer, a lubricant, a crosslinking agent, an anti-blocking agent, a colorant, a light proof agent, and an ultraviolet absorbent.

In the polymer composition wherein the above-mentioned modifier for polymer-molding material is incorporated into a polymer-molding material, the incorporated amount of the modifier for polymer-molding material is appropriately selected in accordance with the kind of the polymer-molding material or required performances, and is usually from 0.1 to 50 parts by weight, preferably from 0.5 to 20 parts by weight, more preferably from 1 to 10 parts by weight, in particular preferably from 2 to 5 parts by weight for 100 parts by weight of the polymer in the polymer-molding material.

By using the polar-group-containing cyclized rubber of the present invention as an adhesive component, such as a vehicle component for primer or a binder component for paint, in the above-mentioned coating agent such as primer or paint for polymer-molding material, the adhesiveness between the polymer-molding material and paint can be remarkably improved. In this case, it is preferred that the cyclized rubber is contained in an amount of 2% or more by weight, preferably 5% or more by weight, more preferably 10% or more by weight of the whole of solid contents in the coating agent such as primer or paint.

In the case of using the cyclized rubber as a coating agent, the cyclized rubber is used in the state that a different adhesive component and various additives are incorporated into the cyclized rubber.

Examples of the different adhesive agent include acrylic resin, urethane resin, polyester resin, epoxy resin, melamine resin, alkyd resin, and chlorinated olefin resin, and silicone resin.

The ratio of the different adhesive agent in the case of the incorporation of this agent is appropriately selected in accordance with the kind thereof and the purpose of the incorporation thereof, and the ratio by weight between the cyclized rubber and the different adhesive agent is usually from 100:0 to 5:95, preferably from 80:20 to 30:70, more preferably from 70:30 to 50:50.

The additives may be the same as the compounding agents, for polymer, exemplified in the item of the modifier.

The coating agent comprising the polar-group-containing cyclized rubber is usually obtained by dissolving or dispersing the polar-group-containing cyclized rubber or a mixture of the polar-group-containing cyclized rubber and other components in a solvent. It is advisable to select the solvent to be used appropriately, and examples thereof include aliphatic hydrocarbon solvents, alicyclic hydrocarbon solvents, aromatic hydrocarbon solvents, ketone solvents, alcohol solvents, ether solvents, halogen solvents, and aqueous solvents. The used amount of the solvent is a range such that the concentration of solid contents in the coating agent will be usually from 1 to 95% by weight, preferably from 5 to 60% by weight.

The coating agent comprising the polar-group-containing cyclized rubber of the invention can be used as a surface-treating agent for dispersing-materials such as various fillers and pigments. When the dispersing-materials are subjected to surface-treatment by using the coating agent, the dispersibility of the dispersing-materials to various polymers is improved.

As the fillers or pigments, which are targets of the surface-treatment, the above-mentioned materials can be used. The used amount of the cyclized rubber is appropriately selected in accordance with the kind of the dispersing-material and the kind of the polymer in which it is dispersed, and is usually from 0.1 to 100 parts by weight, preferably from 5 to 20 parts by weight for 100 parts by weight of the dispersing-material.

The polar-group-containing cyclized rubber of the invention can also be used as an adhesive agent for causing different materials to adhere strongly to each other. In this case, examples of the combination of the different materials include OPP (orientated polypropylene)/CPP (crystalline polypropylene), polypropylene/polyethylene terephthalate, polypropylene/ethylene-vinyl acetate copolymer, and polypropylene/aluminum. The shape thereof is not particularly limited, and is preferably a film or sheet shape. It is possible to adopt, as the method for the bonding, a method of putting the cyclized rubber molded which is a film form between the different materials and then heating and bonding these materials, or a method of applying the coating agent comprising the cyclized rubber onto the surface of one of the materials and then sticking the resultant onto the surface of the other.

EXAMPLES

The present invention will be described in detail by way of the following examples, but the invention is not limited to these examples. The word "part(s)" and the symbol "%" are those based on weight unless otherwise specified.

(1) Weight-Average Molecular Weight and Molecular Weight Distribution

The weight-average molecular weight (Mw) and the number-average molecular weight (Mn) of a polymer were obtained as values in terms of standard polystyrene by gel permeation chromatography (GPC). The molecular weight distribution is represented by the numerical value of Mw/Mn.

(2) Cyclization Ratio

At each of times before and after cyclization reaction of a conjugated diene polymer, the peak area of protons originating from the double bonds therein was measured by $^1$H-NMR analysis; the percentage of the double bonds remaining in the cyclized product was obtained by regarding the area before the cyclization reaction as 100; and the cyclization ratio (%) was calculated from the calculation equation=(100−the percentage of the double bonds remaining in the cyclized product).

(3) Polar-Group Content in a Polymer Containing a Polar Group

The carboxyl amount and hydroxyl amount therein were obtained by the measurement of the acid value and that of the hydroxyl value thereof, respectively.

The acid value and the hydroxyl value were measured in accordance with a method described in "Standard Oil and Fat Analysis Test Method" (Japan Oil Chemists' Society) 2, 4, 1-83. (mgKOH/g)

(4) Glass Transition Temperature

A differential scanning calorimeter (SSC 5200, manufactured by Seiko Instruments Ltd.) was used to measure the glass transition temperature of a polymer under the following conditions: a starting temperature of −100° C. and a temperature-raising rate of 10° C./minute.

(5) Check Pattern Test (Adhesiveness Test)

A painted test piece was cut at intervals of 2 mm with a cutter, so as to have 11 cuts, in its paint face, reaching its basis material. Eleven cuts which were equivalent thereto but perpendicular thereto was made. In this way, 100 squares having sides 2 mm in length were made. A cellophane adhesive tape was stuck closely to the squares, and then the adhesive tape was pulled and peeled forward at an angle of 45° to the squares. The number of squares wherein the paint face remained was counted and evaluated based on the following criterion:

⊚: The number of the remaining squares was 100.
○: The number of the remaining squares was from 95 to 99.
Δ: The number of the remaining squares was from 90 to 94.
x: The number of the remaining squares was 89 or less.

(6) Smoothness

The smoothness of a painted film was evaluated with the naked eye based on the following two ranks:

○: irregularities were hardly present in the painted film and the smoothness thereof was good.
x: Large irregularities were present in the painted film and the smoothness thereof was not good.

Example 1

Into an autoclave equipped with a stirrer were charged 6100 g of toluene and 45.2 mmol of n-buytllithium (a 1.56 mole/liter solution thereof in hexane), and then the internal temperature thereof was raised to 60° C. Thereafter, thereto was continuously added 2600 g of isoprene over 60 minutes while the internal temperature was controlled not to exceed 75° C. After the end of the addition, the reaction was further continued at 70° C. for 1 hour so as to confirm that the polymerization conversion ratio turned into 100%.

Next, 67.8 mmol of carbon dioxide was added thereto, so as to conduct a reaction for 30 minutes. After the end of the reaction, 54 mmol of methanol as a terminator was added thereto so as to yield a "polymer a" having at a chain terminal thereof a carboxyl group.

A portion was sampled from the resultant "polymer a", and then properties thereof were measured. As a result, the weight-average molecular weight was 92,000, the molecular weight distribution was 1.11, and the acid value was 0.6 mgKOH/g.

Subsequently, the autoclave was purged with nitrogen, and then the temperature was raised to 80° C. Thereto was added 31.2 g of p-toluenesulfonic acid so as to conduct a cyclization reaction while the internal temperature was kept at 80° C. After the reaction for 3 hours, thereto was added a 25% solution of sodium carbonate in water, containing 11.9 g of sodium carbonate, so as to terminate the reaction. The solution was stirred at 80° C. for 30 minutes, and subsequently the solution was filtrated with a glass fiber filter having a pore diameter of 1 μm to remove the residue of the catalyst.

To the resultant solution was added 2.6 g of an age resistor, Irganox 1010 (manufactured by Chiba Specialty Chemicals), and then toluene was removed therefrom while the solution was stirred in an oil bath of 160° C. temperature. When the concentration of solid contents turned into 70 to 75% by weight, the solution was poured into a vat coated with tetrafluoroethylene resin. This was dried at 75° C. under a reduced pressure to yield a modified cyclized rubber A.

Properties of the modified cyclized rubber A were measured. The results are shown in Table 1.

Example 2

A polymerization was conducted in the same way as in Example 1 except that the added amount of n-butyllithium was changed to 88.9 mmol, the added amount of carbon dioxide was changed to 133 mmol, and the added amount of methanol was changed to 106 mmol, so as to yield a "polymer b" having at a chain terminal thereof a carboxyl group. The weight-average molecular weight of the resultant "polymer b" was 46,000, the molecular weight distribution was 1.09, and the acid value was 1.2 mgKOH/g.

Subsequently, a cyclization reaction was conducted in the same way as in Example 1 except that the added amount of p-toluenesulfonic acid was changed to 41.6 g and the added amount of sodium carbonate was changed to 15.8 g, so as to yield a modified cyclized rubber B.

Properties of the modified cyclized rubber B were measured. The results are shown in Table 1.

Example 3

A polymerization was conducted in the same way as in Example 1 except that 54.2 mmol of ethylene oxide was added instead of carbon dioxide, so as to yield a "polymer c" having at a chain terminal thereof a hydroxyl group. The weight-average molecular weight of the resultant "polymer c" was 91,000, the molecular weight distribution was 1.06, and the hydroxyl value was 0.7 mgKOH/g.

Subsequently, a cyclization reaction was conducted in the same way as in Example 1 except that the added amount of p-toluenesulfonic acid was changed to 33.2 g and the added amount of sodium carbonate was changed to 11.9 g, so as to yield a modified cyclized rubber C.

Properties of the modified cyclized rubber C were measured. The results are shown in Table 1.

Example 4

A polymerization was conducted in the same way as in Example 3 except that the added amount of n-butyllithium was changed to 88.5 mmol, the added amount of ethylene oxide was changed to 106 mmol, and the added amount of methanol was changed to 106 mmol, so as to yield a "polymer d" having at a chain terminal thereof a hydroxyl group. The weight-average molecular weight of the resultant "polymer d" was 46,000, the molecular weight distribution was 1.05, and the hydroxyl value was 1.5 mgKOH/g.

Subsequently, a cyclization reaction was conducted in the same way as in Example 3 except that the added amount of p-toluenesulfonic acid was changed to 43.6 g and the added amount of sodium carbonate was changed to 15.8 g, so as to yield a modified cyclized rubber D. Properties of the modified cyclized rubber D were measured. The results are shown in Table 1.

Comparative Example 1

The present comparative example was performed with reference to JP-A No. 57-145103.

Into a four-necked flask equipped with a stirrer, a thermometer, a reflux condenser and a nitrogen gas introducing tube were charged 100 parts of polyisoprene (composed of 73% of cis-1,4-structure isoprene units, 22% of trans-1,4-structure isoprene units and 5% of 3,4-structure isoprene units, and having a weight-average molecular weight of 107,000 and a molecular weight distribution of 1.15) cut into pieces 10 mm cubic and 1570 parts of toluene. The flask was purged with nitrogen, and then heated to 80° C. so as to dissolve the polyisoprene into toluene. Thereafter, 2.5 parts of maleic anhydride were added thereto, so as to conduct an addition reaction of maleic anhydride at 180° C. for 1 hour. The resultant reaction solution was charged into 3000 parts of a 1% solution of 2,6-di-tert-butylphenol in acetone to collect the precipitation. This was dried under a reduced pressure to yield a polyisoprene modified with maleic anhydride. This was a product wherein maleic anhydride was added to the main chain of the polyisoprene.

One hundred parts of the modified polyisoprene were dissolved into 730 parts of toluene, and to this solution were added 3.6 parts of p-toluenesulfonic acid. While the solution temperature was kept at 85° C., a cyclization reaction was conducted for 5 hours. The solution was cooled to room temperature, and then 400 parts of ion-exchange water were added thereto, so as to quench the cyclization reaction. The solution was allowed to stand still for 30 minutes to collect the separated oil phase. This oil phase was washed 3 times with 400 parts of ion-exchange water. The oil phase was charged into 1000 parts of a 1% solution of 2,6-di-tert-butylphenol in methanol, and the resultant precipitation was collected. This was dried under a reduced pressure to yield a modified cyclized rubber E. Properties of the modified cyclized rubber E were measured. The results are shown in Table 1.

TABLE 1

| | Example | | | | Comparative Example |
|---|---|---|---|---|---|
| | 1 | 2 | 3 | 4 | 1 |
| Modified cyclized rubber | A | B | C | D | E |
| Weight-average molecular weight | 73,000 | 34,000 | 74,000 | 33,000 | 80,200 |
| Mw/Mn | 1.21 | 1.15 | 1.09 | 1.08 | 1.31 |
| Cyclization ratio (%) | 74 | 76 | 73 | 75 | 76 |
| Acid value (mgKOH/g) | 0.6 | 1.2 | — | — | 5.6 |
| Hydroxyl value (mgKOH/g) | — | — | 0.7 | 1.5 | — |
| Glass transition temperature (° C.) | 47 | 49 | 46 | 48 | 48 |

The modified cyclized rubbers A to E were each a rubber containing no insoluble matter (gel) in toluene.

Example 5

Fifteen parts of the modified cyclized rubber A were dissolved into 70 parts of xylene, and to this solution were added 15 parts of titanium oxide. The resultant was stirred with a high-speed stirrer (DISPER) for 10 minutes. This was diluted with toluene to set the flow-down time thereof to 13-14 seconds at 20° C. in accordance with the Ford cup No. 4 method prescribed in JIS K 5400. In this way, a primer was prepared.

Molding materials shown in Table 2 were used to form resin molded plates X to Z (50 mm×80 mm×3 mm) by injection molding. As the molding material Y, there was used a material obtained by mixing components shown in Table 2 in a Henschel mixer and then melting and kneading the mixture into pellets with a biaxial extruder.

TABLE 2

| Molding material | Raw resin and additives in molding material |
|---|---|
| X | Polypropylene resin (J-3054HP: manufactured by Idemitsu Kosan Co., Ltd.) |
| Y | (1) Polypropylene resin (J-3054HP: manufactured by Idemitsu Kosan Co., Ltd.)<br>(2) Ethylene/butene-1 copolymer (EBM 3021, manufactured by JSR Co.)<br>(3) Talc (JM-209, manufactured by Asada Seifun Co. Ltd.)<br>(1)/(2)/(3) = 68/25/7 (ratio by weight) |
| Z | Hydrogenated ring-opened polymer composed of 15% by weight of ethyltetracyclododecene units and 85% by weight of dicyclopentadiene units (Tg: 103° C., hydrogenation ratio: 99% or more) |

The resin molded plates X to Z were well washed with water and dried. A spray gun having an aperture of 1.0 mm and giving a spray pressure of 3.5 to 5.0 MPa was used to spray-coat each of the resin molded plates with the above-mentioned primer so that the film thickness thereof would be 10 μm. The smoothness of this primer layer was checked. The result is shown in Table 3. After 5 minutes from the coating with the primer, the same spray gun as described above was used to apply two-liquid curable type urethane-based metallic paints (trade name: RB-212 (base paint), and trade name: RB-288 (clear paint), manufactured by NIPPON BEE CHEMICAL CO., LTD.) by bi-coating, so as to set the film thickness of the whole of the paint to 40 μm. The resultant was dried at 23° C. for 15 minutes, and then dried in a non-circulating type drying machine at 80° C. for 30 minutes. The resultant pained test piece was allowed to stand still at room temperature for 3 days, and then subjected to the check pattern test. The result is shown in Table 3.

TABLE 3

| | Example | | | | Comparative Example |
|---|---|---|---|---|---|
| | 5 | 6 | 7 | 8 | 2 |
| Modified cyclized rubber | A | B | C | D | E |
| Smoothness of the primer layer | ○ | ○ | ○ | ○ | x |
| Painted film physical properties (check pattern test) | | | | | |
| Resin molded plate X | ⊙ | ⊙ | ⊙ | ○ | x |
| Resin molded plate Y | ⊙ | ⊙ | ○ | ⊙ | x |
| Resin molded plate Z | ⊙ | ⊙ | ⊙ | ○ | x |

Examples 6 to 8 and Comparative Example 2

Primers were prepared in the same way as in Example 5 except that modified cyclized rubbers B to E shown in Table 3 were each used instead of the modified cyclized rubber A. These were used to form painted test pieces. The smoothness of the painted primer layers and results of the check pattern test of the painted test pieces were each shown in Table 3.

The following can be understood from Table 3.

The primer using a cyclized product of polyisoprene having its main polymer chain modified with maleic anhydride (modified cyclized rubber E) was poor in dispersibility of titanium oxide, and thus the smoothness of the primer layer was poor. The adhesiveness thereof to the paint was also insufficient (Comparative Example 2).

Against the comparative example, the primers using the conjugated diene polymer cyclized products (the modified cyclized rubbers A to D), which each had a polar group at a terminal of a polymer chain thereof, the dispersibility of titanium oxide was very good. Thus, the smoothness of their primer layers was excellent and further the adhesiveness thereof to the paint was remarkably improved (Examples 5 to 8).

Example 9

Ninety five parts of a polypropylene resin (J3050HP, manufactured by Idemitsu Kosan Co., Ltd.), 5 parts of the modified cyclized rubber A and 0.1 part of tetrakis [methylene-3-(3',5'-di-t-butyl-4'-hydroxyphenyl) propionate] methane (Irganox 1010, manufactured by Chiba Specialty Chemicals) were mixed with each other in a Henschel mixer, and then a biaxial extruder was used to mix and knead the mixture at a melting temperature of 200° C., thereby yielding pellets of the resin composition. The pellets were injection-molded to give a molded plate (3 mm thick×50 mm wide×80 mm long).

A spray gun having an aperture of 1.0 mm and giving a spray pressure of 3.5 to 5.0 MPa was used to apply, onto the molded plate, two-liquid curable type urethane-based metallic paints (trade name: RB-212 (base paint), and trade name: RB-288 (clear paint), manufactured by NIPPON BEE CHEMICAL CO., LTD.) by bi-coating, so as to set the film thickness of the whole of the paint to 40 μm. The resultant was dried at 23° C. for 15 minutes, and then dried in a non-circulating type drying machine at 80° C. for 30 minutes. The resultant pained test piece was allowed to stand still at room temperature for 3 days, and then subjected to the check pattern test. The result is shown in Table 4.

Examples 10 to 12 and Comparative Example 3

Molded plates were prepared in the same way as in Example 9 except that the modified cyclized rubbers B to E shown in Table 4 were each used instead of the modified cyclized rubber A. These were used to form painted test pieces. Results of the check pattern test of the painted test pieces were each shown in Table 4.

TABLE 4

|  | Example | | | | Comparative Example |
|---|---|---|---|---|---|
|  | 9 | 10 | 11 | 12 | 3 |
| Modified cyclized rubber | A | B | C | D | E |
| Check pattern test | ◎ | ◎ | ○ | ○ | x |

The following can be understood from Table 4.

The molded plate into which the polyisoprene cyclized product (modified cyclized rubber E), which had a main polymer chain modified with maleic anhydride, was incorporated was insufficient in adhesiveness to the paint (Comparative Example 3).

Against the comparative example, the molded plates into which the conjugated diene polymer cyclized products (the modified cyclized rubbers A to D), which each had a polar group at a terminal of a polymer chain thereof, were incorporated had remarkably improved adhesiveness to the paint (Examples 9 to 12).

INDUSTRIAL APPLICABILITY

The polar-group-containing cyclized rubber of the present invention can be used as a modifier for improving the adhesiveness between polymer-molding material and paint or as an adhesive component which is added to a coating agent such as a primer or paint for polymer-molding material, such as a vehicle component for primer or a binder component for paint, and thus the rubber can be applied to various use purposes. The rubber is in particular useful since the rubber makes it possible to improve remarkably the adhesiveness between nonpolar polymer-molding material and paint.

The invention claimed is:
1. A process for producing a polar-group-containing cyclized rubber, comprising: the steps of:
using an organic active metal catalyst to polymerize a conjugated diene monomer, or a conjugated diene monomer and a monomer copolymerizable with the conjugated diene monomer to produce an active conjugated diene polymer having an active metal at a terminal of a polymer chain thereof;
causing a polar-group-containing compound to react with the active conjugated diene polymer to produce a polar-group-containing conjugated diene polymer having, at a terminal of a polymer chain thereof, a polar group originating from the polar group in the polar-group-containing compound; and
using a cyclizing catalyst to cyclize the polar-group-containing conjugated diene polymer to produce the polar-group-containing cyclized rubber.

2. The process for producing a polar-group-containing cyclized rubber according to claim 1, wherein the conjugated diene monomer is isoprene.

3. The process for producing a polar-group-containing cyclized rubber according to claim 1, where a the polar-group-containing compound is an epoxy compound or carbon dioxide.

4. A process for producing a polar-group-containing cyclized rubber comprising: the steps of:
using a polar-group-containing organic active metal catalyst to polymerize a conjugated diene monomer, or a conjugated diene monomer and a monomer copolymerizable with the conjugated diene monomer to produce a polar-group-containing conjugated diene polymer having a polar group at a polymerization initiation terminal thereof; and
using a cyclizing catalyst to cyclize the polar-group-containing conjugated diene polymer to produce the polar-group-containing cyclized rubber.

5. The process for producing a polar-group-containing cyclized rubber according to claim 4, wherein the polar-group-containing organic active metal catalyst is an organic alkali metal amide compound.

6. The process for producing a polar-group-containing cyclized rubber according to claim 4, wherein the conjugated diene monomer is isoprene.

7. A polar-group-containing cyclized rubber, produced by the process for producing a polar-group-containing cyclized rubber according to claim 1 or 4, having a polar group at a terminal of a polymer chain thereof and having a weight-average molecular weight of 1000 to 100,000.

8. The polar-group-containing cyclized rubber according a to claim 7, wherein the ratio of the weight-average molecular weight (Mw) to the numberaverage molecular weight (Mn) thereof (Mw/Mn) is 4 or less.

9. The polar-group-containing cyclized rubber according to claim 7, wherein the cyclization ratio is 10% or more.

10. The polar-group-containing cyclized rubber according to claim 7, wherein the gel transition temperature is from −50 to 200° C.

11. The polar-group-containing cyclized rubber according to claim 7, wherein the gel amount is 10% or less by weight.

12. The polar-group-containing cyclized rubber according to claim 7, wherein the polar group is at least one group selected from the group consisting of cartboxyl, hydroxyl, amino, thiol, ester, cyano and silyl groups.

13. The polar-group-containing cyclized rubber according to claim 7, wherein the polar group is carboxyl or hydroxyl group.

14. A modifier for polymer-molding material, which comprises, as an effective component, the polar-group-containing cyclized rubber according to claim 7.

15. A polymer composition, wherein the modifier for polymer-molding material according to claim 14 is incorporated into a polymer-molding material.

16. The polymer composition according, to claim 15, wherein the incorporated amount of the modifier for polymer-molding material is from 0.1 to 50 parts by weight for 100 parts by weight of the polymer in the polymer-molding material.

17. The polymer composition according to claim 15, wherein the polymer in the polymer-molding material is a hydrocarbon thermoplastic resin.

18. A coating agent, which comprises the polar-group-containing cyclized rubber according to claim 7.

19. The coating agent according to claim 18, which is a primer.

* * * * *